United States Patent
Brown et al.

(10) Patent No.: US 9,971,804 B2
(45) Date of Patent: *May 15, 2018

(54) ENTITY INTEGRATION USING HIGH-LEVEL SCRIPTING LANGUAGES

(71) Applicant: INTERNATIONAL BUSINESS MACHINES CORPORATION, Armonk, NY (US)

(72) Inventors: Armageddon R. Brown, San Jose, CA (US); Mauricio A. Hernandez, San Jose, CA (US); Georgia Koutrika, Palo Alto, CA (US); Rajasekar Krishnamurthy, San Jose, CA (US); Lucian Popa, San Jose, CA (US); Suresh Thalamati, San Jose, CA (US); Ryan Wisnesky, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/337,981

(22) Filed: Oct. 28, 2016

(65) Prior Publication Data
US 2017/0046383 A1 Feb. 16, 2017

Related U.S. Application Data

(63) Continuation of application No. 13/907,532, filed on May 31, 2013, now Pat. No. 9,535,951.

(51) Int. Cl.
*G06F 17/30* (2006.01)

(52) U.S. Cl.
CPC .. *G06F 17/30445* (2013.01); *G06F 17/30321* (2013.01)

(58) Field of Classification Search
None
See application file for complete search history.

(56) References Cited

U.S. PATENT DOCUMENTS

| 7,152,074 | B2 | 12/2006 | Dettinger et al. |
| 7,912,842 | B1 | 3/2011 | Bayliss |

(Continued)

OTHER PUBLICATIONS

Monica Larre, et al. "MONIL Language, an Alternative for Data Integration", Computación y Sistemas vol. 9 No. 3, pp. 203-226.

(Continued)

*Primary Examiner* — Thu Nga Nguyen
(74) *Attorney, Agent, or Firm* — Erik Huestis; Stephen Kenny; Foley Hoag LLP (57) ABSTRACT

Embodiments of the present invention relate to a new method of entity integration using high-level scripting languages. In one embodiment, a method of and computer product for entity integration is provided. An entity declaration is read from a machine readable medium. The entity declaration describes an entity including at least one nested entity. An index declaration is read from a machine readable medium. The index declaration describes an index of nested entities. An entity population rule is read from a machine readable medium. The entity population rule describes a mapping from an input schema to an output schema. The output schema conforms to the entity declaration. A plurality of input records is read from a first data store. The input records conform to the input schema. The entity population rule applies to the plurality of records to create a plurality of output records complying with the output schema. An index of nested entities is populated. The index complies with the index declaration.

20 Claims, 5 Drawing Sheets

(56) References Cited

U.S. PATENT DOCUMENTS

| | | |
|---|---|---|
| 7,921,416 B2 | 4/2011 | Fontoura et al. |
| 2003/0172368 A1 | 9/2003 | Alumbaugh et al. |
| 2005/0071331 A1 | 3/2005 | Gao et al. |
| 2006/0229853 A1 | 10/2006 | Evans |
| 2007/0276858 A1 | 11/2007 | Cushman et al. |
| 2008/0243885 A1 | 10/2008 | Harger et al. |
| 2012/0239612 A1 | 9/2012 | George et al. |
| 2012/0254842 A1 | 10/2012 | Henderson |
| 2012/0311581 A1 | 12/2012 | Balmin et al. |

OTHER PUBLICATIONS

Mauricio Hernandez, et al. "HIL: A High-Level Scripting Language for Entity Integration", Published in: RJ10499 in 2012.

Arvid Heise, et al., "Integrating Open Government Data with Stratosphere for more Transparency," Preprint submitted to Journal of Web Semantics, Jan. 19, 2012, 17 pages.

Marcus Paradies, et al., "Entity Matching for Semistructured Data in the Cloud," SAC'12 Proceedings of the 27th Annual Symposium on Applied Computing, Mar. 26-30, 2012, Riva (Trento), Italy, ACM, pp. 453-458, 2012.

FIG. 1

Type variable    Unspecified type    Index type    UDF type

Types: T ::= int | string | ... | X | ? | set T | R | fmap $T_1$ to $T_2$ | function $T_1$ to $T_2$
Record Types: R ::= [ $L_1$: $T_1$, ..., $L_n$: $T_n$ ]      // closed record type
            | [ $L_1$: $T_1$, ..., $L_n$: $T_n$, ? ]      // open record type

Entity Declaration: E: set T;            // set-valued entity
            F: fmap $T_1$ to $T_2$;       // finite map (index)
            f: function $T_1$ to $T_2$;   // UDF

Expressions: e ::= c | v | E            // constants, variables, set-valued entities
            | v.$L_1$... $L_m$              // record projection
            | [ $L_1$: $e_1$, ..., $L_n$: $e_n$ ]   // a record
            | dom F                         // the set of all keys in the index F
            | F ! e                         // index lookup
            | f (e)                         // UDF invocation

Predicates: Pred ::= e op e' | f (e)    // comparison operations and boolean UDFs
            | $Pred_1$ and $Pred_2$

Entity Population Rules:
    insert into E                       insert into F ! e'
    select e                            select e
    from $v_1$ in $e_1$, ... $v_k$ in $e_k$     from $v_1$ in $e_1$, ... $v_k$ in $e_k$
    where Pred;                         where Pred;

Entity Resolution Rules (binary case only):
    create link T as                    // Link table
    select [A: key, B: key']            // identifying keys for the entities being matched
    from $v_1$ in $e_1$, ... $v_k$ in $e_k$
    where $match_1$: $Pred_1$, ..., $match_m$: $Pred_m$   // matching rules
    check if Pred then Pred, ...
    group on ($e_1$, ..., $e_l$) keep links Pred , ...
    cardinality key (1:1 | N:1) key';

FIG. 5

ENTITY INTEGRATION USING HIGH-LEVEL SCRIPTING LANGUAGES

BACKGROUND

The present invention relates to information integration, and more specifically, to compiling specifications into efficient run-time queries and optimization steps that improve the run-time performance of entity population by exploiting parallel group-by capabilities in MapReduce systems.

BRIEF SUMMARY

According to one embodiment of the present invention, a method of and computer product for entity integration is provided. In this embodiment, an entity declaration is read from a machine readable medium. The entity declaration describes an entity including at least one nested entity. An index declaration is read from a machine readable medium. The index declaration describes an index of nested entities. An entity population rule is read from a machine readable medium. The entity population rule describes a mapping from an input schema to an output schema. The output schema conforms to the entity declaration. A plurality of input records is read from a first data store. The input records conform to the input schema. The entity population rule applies to the plurality of records to create a plurality of output records complying with the output schema. An index of nested entities is populated. The index complies with the index declaration.

In another embodiment of the present invention a method of and computer product for entity resolution is provided. In this embodiment, an entity declaration is read from a machine readable medium. The entity declaration describes an entity. An entity population rule is read from a machine readable medium. The entity population rule describes a mapping from an input schema to an output schema. The output schema conforms to the entity declaration. A plurality of input records is read from a first data store. The input records conform to the input schema. The entity population rule is applied to the plurality of records to create a plurality of output records complying with the output schema. An entity resolution rule is read from a machine readable medium. The entity resolution rule defines criteria for a link between input entities. The entity resolution rule is applied to the plurality of input records to determine a link between the members of a subset of the plurality of input records.

BRIEF DESCRIPTION OF THE SEVERAL VIEWS OF THE DRAWINGS

FIG. 2 depicts a syntax of a scripting language according to an embodiment of the present invention.

DETAILED DESCRIPTION

The present disclosure provides a high-level scripting language for entity resolution and integration. The language and the accompanying methods, systems, and data structures provides the core logic for complex data processing flows that aggregate facts from large collections of structured or unstructured data into clean, unified entities. Such data processing flows may include many stages of processing that start with information extraction and continue through entity resolution, mapping and fusion. An overall integration flow is described in a script according to the present disclosure through a combination of SQL-like rules that link, map, fuse and aggregate entities. Logical indices are used in the data model to facilitate the modular construction and aggregation of complex entities. A flexible, open type system is adopted to allow proper handling of input data that is irregular, sparse or partially known.

The language of the present disclosure accurately expresses complex integration tasks while still being high-level and focused on logical entities rather than the physical operations. Compilation algorithms translate the script specification into efficient run-time queries that can execute in parallel on a distributed processing platform such as Hadoop or another MapReduce based system. The language and framework of the present disclosure is applicable to entity integration tasks in a variety of fields including: the financial domain, such as the analysis of public filings archived by the U.S. Securities and Exchange Commission (SEC) and social media, such as fusion of data from hundreds of millions of Twitter messages into tens of millions of structured entities.

In general, the language and methods of the present disclosure are suitable for data integration tasks both inside and outside the enterprise. A variety of publically available data sources exist outside the enterprise, which may provide valuable information and insights. For example, widely available resources include: bibliographic repositories (DBLP, Cora, Citeseer), online movie databases (IMDB), knowledge bases (Wikipedia, DBPedia, Freebase), social media data (Twitter, blogs), U.S. federal government data, congressional and census data, and financial reports archived by the U.S. Securities and Exchange Commission (SEC).

Systematic analysis of such data at the aggregated-level may be performed by building an entity or concept-centric view of the domain, where the important entities and their relationships are extracted and integrated from the underlying documents. The process of extracting data from documents, integrating the information, and then building domain-specific entities, is referred to herein as entity integration. The challenges of such integration are addressed by the present disclosure through provision of tools and languages that are high-level but still expressive enough to facilitate the end-to-end development and maintenance of complex integration flows.

Complex entity integration tasks may include the application of various techniques including: information extraction, schema matching, schema mapping, entity resolution, and data fusion. In many complex scenarios, all of these techniques are used in cooperation, in a flow, to address the various challenges of the input data. For example, the input data may be unstructured, in which case it may require extraction to produce structured records; it may have variations in its format and accompanying attributes, which necessitates repeated mapping and transformation; or it may have variations in the identifying attributes of entities, which necessitates entity resolution, that is, the identification of the same real-world entity across different records. Moreover, fusion (which is conceptually related to aggregation) is needed to merge all the facts about the same real-world entity into one integrated, clean object.

The language of the present disclosure is a scripting language that specifies the structured part of complex integration flows. The language may be referred to as "High-level Integration Language" or HIL. HIL captures in one framework the mapping, fusion, and entity resolution types of operations. HIL may be coupled with an additional high-level language for information extraction. HIL provides the precise logic of a structured integration flow while leaving out the execution details that may be particular to a run-time engine. HIL may be leveraged by developers that perform complex, industrial-strength entity integration and analysis. HIL offers a more focused, more uniform and higher-level alternative than programming in general purpose languages (e.g., Java, Perl, Scala), using ETL tools, or using general data manipulation languages (e.g., XQuery, XSLT).

HIL exposes a data model and constructs that are specific for the various tasks in entity integration flows. First, HIL defines the main entity types, which are the logical objects that a user intends to create and manipulate. Each entity type represents a collection of entities, possibly indexed by certain attributes. The HIL design comprises indexes, which are logical structures that facilitate the hierarchical, modular construction of entities from the ground up. Entities may be built or aggregated from simpler, lower-level entities. HIL uses record polymorphism and type inference, allowing schemas to be partially specified. In turn, this enables incremental development where entity types evolve and increase in complexity.

HIL comprises two types of rules that use a SQL-like syntax. Entity population rules express the mapping and transformation of data from one type into another, as well as fusion and aggregation of data. Entity resolution rules express the matching and linking of entities, by capturing all possible ways of matching entities, and by using constraints to filter out undesired matches.

HIL scripts are compiled into efficient executable code. During compilation, platform-independent optimization techniques are applied to map large fragments of HIL rules (both entity population and entity resolution) into joins. Additional optimization techniques are provided that are specifically targeted toward individual distributed processing platforms such as Hadoop or other MapReduce systems. In particular, a co-group technique may be applied to fuse multiple HIL indexes in parallel and access them as one, thus facilitating the fusion of complexly structured entities from large amounts of data.

As an alternative to the approach described in further detail below, a three-level architecture comprising schema matching, internal mapping, and low-level transformation may be adopted. The schema matching and mapping layers may address mapping and transformation aspects of data integration. Data transformation code may be generated by matching schema elements (automatically or in a GUI). The result of matching may be compiled into an intermediate, internal mapping representation, which is then translated into lower-level languages (e.g., SQL, XQuery, XSLT). A practical issue in this three-level architecture (schema matching, internal mapping, low-level transformation) is that, the generated transformation will not fully achieve the intended semantics of the user. As a result, the user has to modify or customize the transformation.

The approaches described herein provide a more flexible approach than such a three-level architecture. The programmable language of the present disclosure (HIL) operates at the same level as the internal representations used in schema mapping tools. The programmer has full control over specifying the mapping and fusion rules. These rules have a completely specified semantics in terms of execution, while at the same time being above the low-level execution layer. HIL provides a hybrid of schema mapping formalisms and easy and intuitive language. HIL may omit features such as Skolem functions and complex quantifiers, does not require any a priori schemas, is polymorphic (to address heterogeneity and complexity in the input data), and includes user-defined functions that can be used for aggregation and data cleaning (e.g., normalization). Furthermore, HIL includes features such as the use of first-class indexes at the data model level, in order to model, explicitly, the important data structures in the integration flow. Indexes allow the decorrelation of complex integration tasks into simple and efficient rules. HIL additionally includes the notion of a flow of rules.

By providing a high level language such as HIL, a black box approach is avoided. For example, entity resolution may be approached from a record similarity perspective. Record similarity may be measured by edit distance, TF/IDF, Jaro and complex multi-attribute measures. Pairs of similar records may then be generated and clustered with respect to various constraints. However, application of such a method precludes a user from specifying the rules and constraints that determine when two entities match. Instead, this logic is hard-wired in the algorithm that internally determines the trade-off between the accuracy of the result and its computational cost.

HIL rules provide explicit resolution actions on constraint violations, with deterministic results. This is in contrast to alternative, declarative, entity resolution approaches. Furthermore, the combination of entity resolution rules together with the rules for mapping, fusion and aggregation of data, in one framework, provides the expressive power to achieve complex, end-to-end integration tasks.

Figure 1:
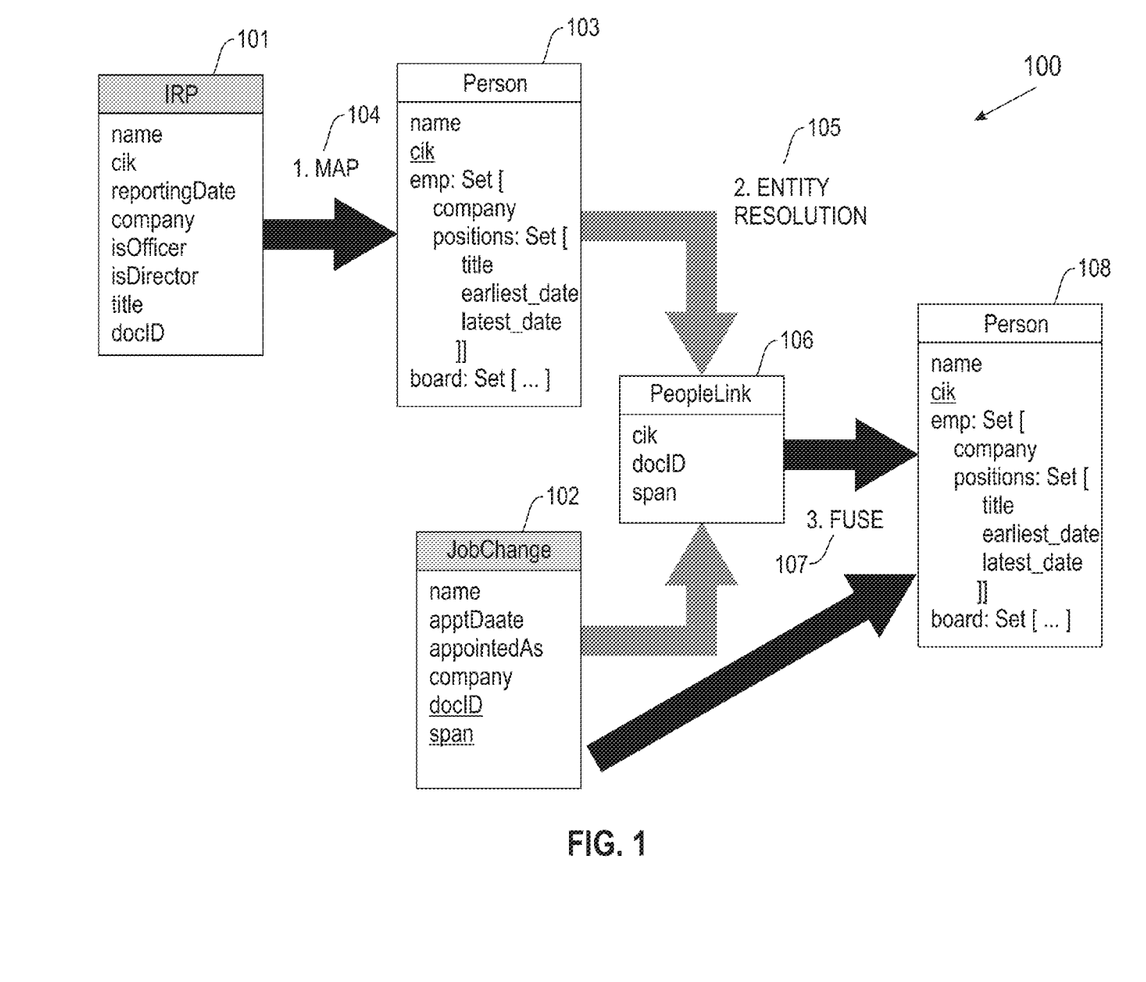
FIG. 1 depicts an exemplary entity integration flow according to an embodiment of the present invention.

With reference now to FIG. 1, an example entity integration task is provided using the language and methods of the present disclosure. In this example financial integration scenario, company and people entities, together with their relationships, are extracted and integrated from regulatory SEC filings that are in semi-structured or unstructured (text) form. While SEC integration is one example application out of many, it is a good illustration of the kind of integration that is performed by financial data providers.

In the absence of the presently disclosed methods, these providers often use a combination of manual methods (e.g., copy-and-paste then clean) and low-level coding to achieve a reasonable level of clean integrated data. The subsequent, structured part of entity integration may be a complex mixture of domain-specific rules for entity resolution, mapping and fusion. In contrast, the present disclosure allows a developer to focus on the logical entities and the logical integration steps, declaratively, in the manner similar to the way that SQL provides a higher-level alternative to a physical plan based on relational algebra operators.

Simplified integration flow 100 constructs an entity type Person, representing the key people of major U.S. companies. Flow 100 uses two input data sets: InsiderReportPerson 101 (or, IRP in short) and JobChange 102. The first is a set of records extracted from XML insider reports. These reports are filed periodically by companies to state compensation-related aspects about their officers and directors. Each extracted record includes the person name, a central identification key (cik, a global SEC-assigned key for that person), a company identifier, the reporting date, and whether the person is an officer or a director. If the person is an officer, the title attribute contains the executive position (e.g., "CEO", "CFO", etc).

The second data set, JobChange 102, consists of records extracted from textual reports that disclose job changes or new appointments in a company. These records exhibit high variability in the quality of data (e.g., people names, positions). A record in JobChange 102 includes the extracted person name, the appointment date, the position (appointedAs), and information about the appointing company. However, it does not include any key identifying the person. The attributes docid and span identify the document and the position within the document where the person name has been extracted from. Together, they serve as an identifier for the particular person occurrence. The same real-world person may occur in many documents or many places in the same document.

The language of the present disclosure (HIL) includes: (1) entities, defining the logical objects (including the input data sources); (2) rules, for either populating the entities or linking among the entities; and (3) user-defined functions, which accompany rules and perform operations such as string-similarity or cleansing and normalization of values. HIL also includes index entities, which can be shared among the rules and facilitate the hierarchical, modular specification of the integration flow, as well as various forms of aggregation.

An example entity population rule suitable for use in conjunction with flow 100 is provided below at Inset 1. The first and second lines declare the input and output entities, respectively, by giving a partial specification of their types. The first declaration corresponds to data set 101 (IRP), while the second declaration corresponds to output entity 103. More entities may be added later to describe additional data structures (e.g., indexes). A first rule (m1) is provided to populate the top-level attributes of Person as part of map process 104.

---
Inset 1

IRP: set [name: string, cik: int, ?];
Person: set [name: ?, cik: ?, emp: set ?, ?];
rule m1:    insert into Person
            select [name: i.name, cik: i.cik]
            from IRP i;

---

The data model of HIL allows for sets and records that can be arbitrarily nested. In the above, IRP and Person are both sets of records. The type system of HIL allows an unspecified type (denoted by ? in the declarations of Inset 1) to be provided in any place where a type can appear (i.e., as the type of an attribute or as the type of the elements in a set). Moreover, records themselves may be left open, meaning that there can be additional fields that are either unknown or not relevant at a given point in the flow. Open records are especially useful when schemas are complex but only some fields are relevant to the current transformation. As more rules and declarations are added, HIL will dynamically refine the types of the entities, by inferring the most general types that are consistent with all the declarations.

An entity population rule (e.g., m1 in Inset 1, above) uses a select-from-where pattern to specify a query over one or more input entities; this query extracts data that is then used to populate (partially) the output entity in the insert clause. For example, rule m1 specifies that for each record i from IRP, the name and cik fields are selected and used to populate the corresponding attributes of a Person record. The select clause of a rule contains, in general, a record expression (possibly composite).

The semantics of an entity population rule is one of containment. For each tuple that is in the result of the select-from-where statement, there must be a tuple in the target entity (in the insert clause) with corresponding attributes and values. Thus, like types, entity population rules are open. In this example, Person entities may contain additional data (e.g., more records or even more attributes for the same record) that will be specified via other rules. This adopts an open-world assumption for the purposes of data integration. Since rules define only partially the target entities, it is the role of the HIL compiler (described in further detail below) to take all the declarations and create an executable set of queries that produce the final target entities.

Finite Maps (Indexes) allow the modular and hierarchical construction of entities. The above rule m1 specifies how to map the top part of Person, but is silent about the nested set emp, which represents the employment history of a person. According to an embodiment of the present disclosure, entity population rules only map tuples into one target set. Any nested set (e.g., emp) is populated separately via a finite map or index. Similarly, any aggregated value that needs to appear in an entity will be computed by utilizing an index, which is populated separately.

An index is declared as a finite map: fmap $T_1$ to $T_2$, where $T_1$ is the type of keys and $T_2$ is the type of entries. In many cases, $T_2$ is a set type itself. In Inset 2, below, an Employment entity is declared to be an index that associates a person identifier (i.e., cik) with the employment history of that person (i.e., a set of companies, each with a set of positions).

---
Inset 2

Employment: fmap [cik: int]
    to set [company: string, positions: set ?];

---

This declaration may be visualized in terms of a hash table where each key has the form [cik: <person_cik>] and whose associated value is a set of employment tuples for <person_cik>, each for a particular company. Inset 3 shows a revised rule m1 that specifies that the nested emp set of Person is the result of an index lookup on Employment (! is used for the lookup operation).

---
Inset 3 rule m1':   insert into Person
            select [ name: i.name, cik: i.cik,
                emp: Employment![cik: i.cik] ]
            from IRP i;

---

The rule assumes that Employment has been or will be separately constructed, and simply accesses its entry for the key i.cik. The above specification components do not state how to populate Employment but rather how it is used in Person. Separate rules may now be used to populate Employment. In particular, rule m2 in Inset 4 populates Employment based on data from IRP:

Inset 4

```
rule m2:   insert into Employment![cik: i.cik]
           select [company: i.company,
                  positions: Positions![cik: i.cik, company: i.company] ]
           from IRP i
           where i.isOfficer = true;
```

Following the general pattern discussed above, to populate the positions field, rule m2 relies on a separate entity, Positions, that is indexed by person cik and by company. Rule m2 also populates an index. For each record i in IRP where isOfficer is true, we insert a tuple in the entry of the Employment index that is associated with the key i.cik. Different entries in Employment, corresponding to different cik values, may be touched. Note also that multiple tuples may be inserted in the same Employment entry, corresponding to multiple input records with the same cik value but different company values.

Indexes often reflect the natural way in which logical entities need to be accessed. In this example, employment histories need to be looked up by person key, while positions represent a finer-grained view that is indexed by both person key and company. Furthermore, indexes are a convenient mechanism to de-correlate and decompose what would otherwise be complex rules into much simpler rules. In particular, the rules that populate a top-level entity (e.g., a person) are decorrelated from the rules that populate the associated substructures (e.g., employment of a person). In this example, subsequent rules may further populate the Employment index, without affecting any of the existing rules for Person.

There is no intrinsic order among the entity population rules. In this example, the rule to populate Employment was provided after the rule for Person, but the order may be reversed. It is up to the programmer to define the conceptual flow of entities and of rules. In contrast, it is the role of the compiler to stage the execution so that any intermediate entities are fully materialized before they are used in other entities (i.e., all rules for Employment must be applied before materializing Person). In some embodiments, recursion is not allowed among the entity population rules.

Rule m3 in Inset 5 provides for the actual population of Positions from IRP, with the help of a UDF or user-defined function, normTitle, to normalize the title string associated with a particular position. Normalization is an operation that is frequently encountered in data cleansing, and often requires customization. Only the signature of the function is provided. The actual implementation of such function may be provided (either in Java or Jaql) via a binding mechanism.

Inset 5

```
normTitle:   function string to string;
rule m3:     insert into Positions![cik: i.cik, company: i.company]
             select [title: normTitle(i.title)]
             from IRP i
             where i.isOfficer = true;
```

An index as defined above may be used to perform aggregation. Aggregation is similar to the way nested sets are constructed, except that an actual function is needed to reduce a set to a single value. In the example below, the earliest_date is computed for a position (the latest_date is similar).

Each position generated (e.g., by rule m3) originates in some input document that contains a date (i.e., the reportingDate attribute of IRP). To compute the earliest date for a position, an auxiliary data structure may be used to keep track of all the reporting dates for a position (of a given person with a given company). Thus, an "inverted" index PosInfo is defined at Inset 6 that associates a set of dates with each triple (cik, company, title). This set of dates represents a form of provenance for the triple. In other examples, another source field may be used such as docID.

Inset 6

```
PosInfo: fmap [cik: int, company: string, title: string]
         to set [date: ?, ?];
rule m4:   insert into PosInfo![cik: i.cik, company: i.company,
                  title: normTitle(i.title)]
           select [date: i.reportingDate]
           from IRP i
           where i.isOfficer = true;
```

Rule m4 parallels the earlier rule m3. Whenever m3 produces a normalized title for a given cik and company, rule m4 produces the reporting dates (for all the input records in IRP that have the same cik, company and normalized title). In general, there may be additional rules to populate this inverted index, since there may be more data sources or more rules (beyond m3) to populate Positions.

Computing the earliest date for a position amounts then to obtaining the minimum date in a set of dates. In Inset 7, a use-defined function minDate is declared, for which a simple implementation in Jaql is provided.

Inset 7

```
minDate: function set [date: t, ?] to t;
@jaql { minDate = fn(a) min (a[*].date); }
```

The earlier rule m3 may then be changed to use the inverted index by adding the code at Inset 8 to the select clause.

Inset 8

```
(*) earliest_date: minDate(PosInfo![cik: i.cik, company: i.company,
        title: normTitle(i.title)])
```

The above provides the main entity population rules to construct a Person entity, and some of the associated structure (e.g., employment and positions) from one input data source. Additional data sources may be leveraged to enrich this basic scenario. Entity resolution rules are applied in the second step 105 of flow 100.

An entity resolution rule takes as input sets of entities and produces as output a set of links (e.g., 106) between these entities. Each link entity contains references to the input entities and represents a semantic association or correspondence between those entities. For example, if the input entities contain information about people, the generated links will connect those entities that contain, presumably, information about the same real-world person.

An entity resolution rule uses a select-from-where pattern to specify how input entities are linked. The from clause specifies the input sets of entities that are to be linked. The where clause describes all possible ways in which input entities can match. For example, one can specify that if the names of people in two lists are "similar", then a "candidate" link exists between the two people. Furthermore, additional clauses, including check, group by and cardinality clauses specify constraints that filter the "candidate" links. For instance, if only one-to-one matches between people entities are allowed, candidate links that connect one person in one list with multiple persons in another list will be dropped.

In this example, Person entities are matched with JobChange entities using a person's name and employment history. If the name of the company that filed the job change already appears on the person's employment history, then both the company and the person names may be used to match the corresponding input entities. Otherwise, a strong similarity match is used on the person names. In both cases, a match is undesirable if a different birthday appears in both entities. Furthermore, in this particular entity resolution task, one Person entity may match multiple JobChange entities. However, multiple Person entities cannot match the same JobChange entity. When this conflict arises, the strongest links are preferred (e.g., those that match identical person names).

All of these matching requirements are compactly captured in entity resolution rule er1 in Inset 9.

---
Inset 9
--- rule er1:  create link PeopleLink as
           select [cik: p.cik, docid: j.docID, span: j.span]
           from Person p, JobChange j, p.emp e
           where match1: e.company = j.company and
                         compareName(p.name, j.name),
                 match2: normalize(p.name) = normalize(j.name)
           check if not(null(j.bdate)) and not(null(p.bdate))
                 then j.bdate = p.bdate
           group on (j.docID, j.span) keep links p.name = j.name
           cardinality (j.docID, j.span) N:1 (p.cik);

---

The create clause of rule er1 specifies the name of the output set of entities (called PeopleLink here, which corresponds to 106 in flow 100). The select clause restricts the attributes kept from the input entities to describe the link entities. For each link, the key attributes of the input entities are maintained so that they may be linked back to (along with any other information that may be required). In rule er1, the (docid, span) is kept from each JobChange and the person cik. Similarly to SQL, the create and select clauses are logically applied at the end, after processing the other clauses.

The from clause names the sets of entities that will be used to create links, which in this example are the sets Person and JobChange. This clause may also include other auxiliary sets, like the nested set p.emp that contains the employment of a person p. In this way, a user may link entities not only by matching attribute values but also by matching a value (such as a company name) to a set of values (e.g., the set of companies in a person's employment history). The from clause defines a set C of tuples of entities, corresponding roughly to the Cartesian product of all input sets. However, if a nested set in the from clause is empty, C will still contain an entry that combines the other parts. In this example, if a particular p.emp is empty, the corresponding Person and JobChange entities will appear in C with a value of null in the p.emp part.

The where clause specifies the possible ways in which the input entities can be matched and essentially selects a subset of C. Each possible matching has a label (used for provenance of matches) and a predicate on the entities bounded in the from clause. Rule er1 specifies two matchings, labeled match1 and match2. A matching predicate is a conjunction of conditions that combine equality and relational operators (e.g., e.company=j.company), boolean matching functions (e.g., compareName(p.name, j.name)) and transformation functions (e.g., normalize(p.name)). For example, match1 states that a JobChange entity can match a Person if the company name in JobChange is in the Person's employment history and the person names match. For comparing person names, match1 uses compare-Name, a specialized UDF that we have built for this purpose. Match2 uses only an equi-join on the normalized person names to count for those cases that the company filing a job change for a person is not in the employment history of that person.

HIL filters out any tuple in C that does not satisfy any of the specified matchings. In effect, every matching $r_i(1 \leq i \leq n)$ results in a $C_i = \sigma_{r_i}(C) \subseteq C$. The result of the where clause is the union of all these subsets, $W = \cup^n_i C_i$, which we call the "candidate links". All matchings in an entity resolution rule will be evaluated, regardless of their relative order and whether a matching evaluates to true or false.

While rule er1 uses simple matching predicates with equi-joins and boolean matching functions, several complex matching predicates may be combined within a single entity resolution rule to account for variations in the data. Entity resolution rules may also specify semantic constraints that are required to hold on the output links and provide explicit resolution actions on constraint violations ensuring that the result is deterministic. The clauses check, group and cardinality serve this purpose and appear in an entity resolution rule in this order.

A check clause specifies further predicates that are applied to each candidate link. A check clause has the form if $p_k$ then $c_k$, with $p_k$ and $c_k$ being predicates over the candidate links. For every candidate link in W, if $p_k$ evaluates to true, then the link is kept only if $c_k$ also evaluates to true. In this example, if the entities for a person in a candidate link contain non-null birthdates, then the birthdates must match. In effect, a check clause specifies a global condition that must be satisfied by all candidate links matching $p_k$, regardless of the matching predicates. That is why although this condition could be "pushed-up" to each matching predicate, it is more convenient to specify it in a check clause.

The group on clause applies predicates to groups of candidate links. The clause specifies a list of attributes that serves as a grouping key and a predicate that is applied to all entities in a group. In this example, a person occurrence in a JobChange entity (at 102, identified by (docID, span)) may be linked to multiple entities in Person 103. Any link where the person name in both linked entities is exactly the same should be kept (while the other links are rejected) because having the same name provides stronger indication that a match has been located. When there are no such "strong" links, in this example, weaker links are kept. Additional group and cardinality constraints may be specified to further refine the links. By adjusting the keep links part of the group clause to keep only links, the rule may be changed so that only the strongest links survive.

Additional types of group constraints are available. For example, aggregate functions may be used on the attributes of a group to decide whether to keep the links or not. For example, the constraint in Inset 10 keeps the most recent job change among all those filed by the same company for the same person (cik). As another yet example, the provenance of the link may be used to select links that are created by stronger matching predicates. For example, it may be specified that if a JobChange matches several Person entities, then any links created by match1 should be kept. The use of such group-based conditions provides a reason to evaluate all matchings defined in the where clause.

| Inset 10 | |
|---|---|
| group on | (p.cik) keep links<br>e.company = j.company and<br>j.apptDate = max(j.apptDate) |

Finally, a cardinality clause asserts the number of links a single entity can participate in (one or many). For example, the cardinality clause in er1 asserts that each (docID, span) pair should be linked to exactly one Person entity (but that Person entity can be linked to many JobChange entities). In the final result, if a (docID, span) pair maps to multiple ciks, then all these links are considered ambiguous and dropped from the output.

Additional rules are provided for fusion step 107 of flow 100. The following entity population rules fuse the new data from JobChange 102 into the employment and position indexes of a person 108. These rules make use of a join with the PeopleLink table 106, which was computed by the previous entity resolution step. No modification of the main rule m1' for Person is necessary.

| Inset 11 | |
|---|---|
| rule m5: | insert into Employment![cik: l.cik]<br>select [ company: j.company,<br>    positions: Positions![cik: l.cik, company: j.company] ]<br>from JobChange j, PeopleLink l<br>where j.docid = l.docid and j.span = l.span<br>and isOfficer (j.appointedAs) = true; |
| rule m6: | insert into Positions![cik: l.cik, company: j.company]<br>select [title: normTitle(j.appointedAs)]<br>from JobChange j, PeopleLink l<br>where j.docid = l.docid and j.span = l.span<br>and isOfficer(j.appointedAs) = true; |

Rules m5 and m6 are similar to the earlier rules m2 and m3, except that the new data values (for company and title) come now from JobChange 102, while the cik of the person comes from PeopleLink 106. The join between JobChange and PeopleLink is based on docid and span, which form a key for JobChange. The rules also include a filter condition (and an UDF) to select only officers (and not directors).

Since HIL uses set semantics, the effect of rule m5 is that a new company entry will be inserted into the Employment index only if it did not exist a priori (e.g., due to rule m2) for the given person cik. If the company exists, then there is still a chance that the corresponding set of positions will be changed, since rule m6 may apply.

The earliest and latest dates for a position will be adjusted accordingly, since there is now new data. To achieve this, the inverted index, PosInfo, that keeps track of all the reporting dates for a position, is also updated based on the new data. Thus, need to write another rule is necessary (not shown here) that is similar to the earlier rule m4 except that JobChange and PeopleLink are used in place of IRP. The actual specification for earliest_date remains the same—the equation (*) of Inset 8 and the associate discussion applies here as well, with the difference that the minDate aggregation will now work on a larger set.

No new target data structures (entities or indexes) are necessary. The new rules assert new data into the same indexes declared by the initial mapping phase. This same pattern will typically apply when fusing any new data source: first, write entity resolution rules to link the new data source to the existing target data, then write entity population rules to fuse the new data into the target entities (and indexes).

FIG. 2 gives the core syntax of HIL. A HIL program is a sequence of declarations of entities and rules. The rules for entity population and entity resolution include the same building blocks: expressions, predicates, and the shape of variable bindings that appear in the from clause. Two forms of entity population rules are supported, the ones that insert into set-valued entities, and the ones that insert into indexes. In some embodiments, indexes and functions are always top-level values (i.e., they must be declared as global entities, and cannot appear nested inside other values).

User-defined functions may be used to cleanse and normalize the individual values that appear in a source attribute. A slightly different operation that is also common and may involve user-defined functions is conflict resolution. Such operation is needed when the integration process yields multiple (conflicting or overlapping) values for an attribute that is required to be single-valued, if certain functional dependencies must hold.

To illustrate, consider rule m1 of Inset 1. If a person with a given cik appears under different names in the data sources, then the resulting set of Person entities will contain duplicate entries (each with a different name) for the same cik. To avoid such duplication, a solution is to maintain a separate index, call it Aliases, which collects all the variations of a person's name across all known inputs. Rules must be added to explicitly populate the Aliases index, from the given data sources. Furthermore, the rule m1 for Person must be modified so that a unique name is selected, possibly via a user-defined function, from the list of aliases. This process becomes more sophisticated if further attributes, such as the provenance of each alias, are also maintained in the index and then used in the selection function.

In some embodiments, the language of the present disclosure further supports blocking and score-based matching. Blocking is a mechanism that is used to reduce the number of comparisons among input entities, by partitioning them according to some criteria (called blocking criteria or keys). Score-based matching, on the other hand, allows matching decisions to be made based on scores assigned to pairs of entities. A scorebased entity resolution rule in HIL uses matching conditions in the where clause that are based on UDFs that compute the similarity of two records (e.g., based on distance, on features, or based on probabilistic similarity measures). The scores computed by the matching conditions can then be used in the check clause (e.g., averaged and compared to a threshold value).

HIL entity population rules are compiled into efficient runtime queries. The naive semantics of entity population rules is to identify all the applicable rules, that is, rules which generate new facts, and to insert all the new facts into the target entities (either sets or indexes). This process would repeat until no new facts are generated. To avoid such iterative and inefficient process, compilation (or query generation) is used to implement the semantics. In some embodiments, it is assumed that there there is no recursion allowed among the entity population rules. With this assumption, the entities can be topologically sorted based on the dependencies induced by the rules, and then unions of queries may be generated (with no recursion) to populate the entities.

Figure 3:
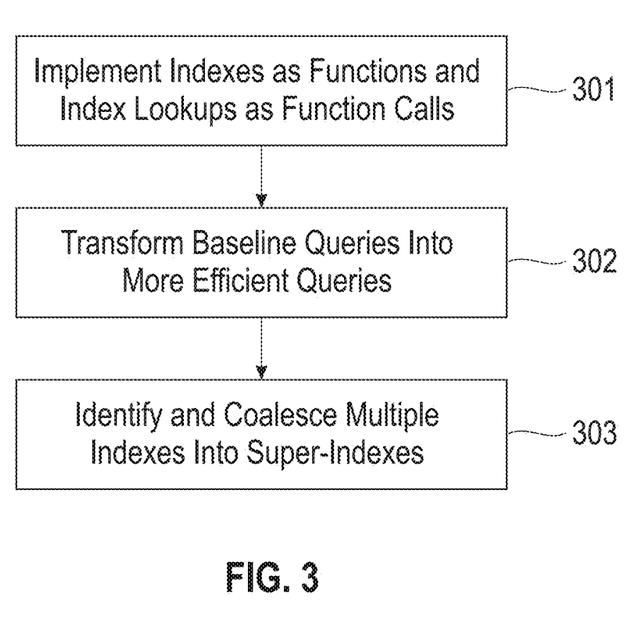
FIG. 3 depicts a method of query generation according to an embodiment of the present invention.

Query generation may be broken into several steps as shown in FIG. 3. In the first step 301, the indexes are implemented as functions and index lookups as function calls. In a second step 302, the baseline queries are transformed into more efficient queries, where indexes are implemented as materialized binary tables and index lookups are implemented via joins. A final optimization step 303, which is targeted to Jaql and Hadoop, identifies multiple indexes that can be coalesced together into super-indexes, which can then be accessed in a single join operation from the parent entity. Other Hadoop-oriented optimizations that are implemented in some embodiments of the compiler include pipelining of intermediate results whenever possible, and delaying duplicate elimination until needed. Both of these optimizations allow the fusion of multiple map jobs into a single job, on a MapReduce platform.

For each entity that appears in the insert clause of an enriched rule, a query term is generated to reflect the effect of that rule. Since there may be many rules mapping into the same entity, the query for an entity will include a union of query terms (one per rule). In the additional case when the entity is an index, the union of query terms is encapsulated into a function. Furthermore, the query terms are parameterized by the argument of the function.

With reference to the Example of FIG. 1, assume that rule m1' (at Inset 3) and m2 (at Inset 4) are the only available rules. The following two queries (shown in Inset 12 in an abstract syntax that resembles the rules) are generated for Person and Employment.

---
Inset 12
---

```
Person :=      select [ name: i.name, cik: i.cik,
                       emp: EmploymentFn (cik: i.cik) ]
               from IRP i;
EmploymentFn :=
    fn (arg). select [ company: i.company,
                       positions: PositionsFn ([ cik: i.cik,
                           company: i.company]) ]
           from IRP i
           where arg = [cik: i.cik] and i.isOfficer = true;
```

The first query is immediate and reflects directly the rule m1'. To compute the value of emp, a function call is used that corresponds to the index lookup on Employment. The second query, for Employment, is the actual function, with a parameter arg that represents possible keys into the index. The function returns a non-empty set of values only for a finite set of keys, namely those that are given by the rule m2 (assuming, for the purposes of this example, that this is the only rule mapping into Employment). More concretely, if the parameter arg coincides with an actual key [cik: i.cik] that is asserted by the rule m2, then the set of all associated entries is returned. Otherwise, the empty set is returned. To achieve this behavior, the body of the function is a parameterized query term, whose where clause contains the equality between the argument and the actual key. Similarly to the query for Person, the positions field in the ouput employment record is computed via a call to a function (not shown) that implements the Positions index.

In some cases, multiple rules map into an entity and, hence, the expression defining the entity incorporates a union of query terms. If the additional rule m5 for Employment (shown at Inset 11) is considered, the expression for EmploymentFn changes to the following function.

---
Inset 13
---

```
EmploymentFn :=
    fn (arg). select [ company: i.company,
                       positions: PositionsFn ([ cik: i.cik,
                           company: i.company]) ]
           from IRP i
           where arg = [cik: i.cik] and i.isOfficer = true
       union
           select [ company: j.company
                       positions: PositionsFn ([ cik: l.cik,
                           company: j.company]) ]
           from JobChange j, PeopleLink l
           where j.docid = l.docid and j.span = l.span
                and arg = [cik:l.cik] and isOfficer (j.appointedAs) = true;
```

For a given parameter arg, there are now two query terms that can generate entries for the Employment index. The first query term is as before; the second query term, obtained from rule m5, contains a similar condition requiring the equality between the parameter arg and the actual key [cik:l.cik].

As shown in these examples, during HIL compilation, an intermediate query syntax is used that is independent of a particular query language. Translating from this syntax to a query language such as Jaql or XQuery is immediate. In some embodiments, Jaql is the target execution language.

While the baseline algorithm gives rise to query expressions that map directly to the HIL entity types and rules, these query expressions can also be inefficient. In particular, indexes are not stored; an index lookup is computed, on the fly, by invoking the function associated with the index, which in turn executes the query terms inside the body. As a result, the query terms within a function will be executed many times during the evaluation of a HIL program. In some embodiments, the baseline strategy is modified to avoid such inefficiency.

For each HIL entity that is an index (or finite map), a query is generated that produces a binary table. This binary table explicitly stores the graph of the finite map, that is, the set of all pairs of the form (k, v), where k is a key and v is the value associated with the key. Since v is typically a set (e.g., for each person cik, there exists a set of employment records), the generated query consists of two parts. First, a union of query terms is generated that accumulates pairs of the form (k, e) where e is an individual value (e.g., a single employment record). Then, a group by operation is applied that collects all the entries for the same key into a single set.

To illustrate, instead of using a function for the Employment index, the following query may be used.

---
Inset 14
---

```
Employment := group by key
    ( select [ key: [cik: i.cik],
               val: [company: i.company,
                     positions: PositionsFn ([cik: i.cik,
                         company: i.company]) ] ]
      from IRP i
      where i.isOfficer = true
    union
      select [ key: [cik: l.cik],
               val: [company: j.company
                     positions: PositionsFn ([ cik: l.cik,
                         company: j.company]) ] ]
      from JobChange j, PeopleLink l
      where j.docid = l.docid and j.span = l.span
            and isOfficer (j.appointedAs) = true);
```

The transformation from EmploymentFn to the actual query for Employment is not yet complete, since the Positions index is still accessed via a function call to PositionsFn. The two inner query terms are similar to the ones in the earlier EmploymentFn. However, instead of being parameterized by the argument key, they explicitly output all the relevant (key, value) pairs. The outer group by is an operation that transforms set [key: t1, val: t2] into set [key: t1, val: set t2].

For each reference to an index (earlier expressed via a function call), a join is applied to the binary table that materializes the index. Since an index is a finite map (i.e., it is defined for only a finite set of keys), the join must be an outer join, where the nullable part is with respect to the index that is being invoked. To illustrate, the earlier query for Person is replaced with the below.

Inset 15

Person := select [ name: i.name, cik: i.cik, emp: emptyIfNull (e.val) ]
    from IRP i left outer join Employment e
    on [cik: i.cik] = e.key;

In the above, the left outer join has a similar semantics to the corresponding SQL. Thus, the query always emits an output tuple for each entry in IRP. Furthermore, if there is a match with Employment, as specified by the on clause of the outer join, then e.val is non-null and becomes the output set of employment records. If there is no match, then e.val is null and the empty set is output for emp.

In some embodiments, the procedure for replacing index lookup operations with joins accounts for the case when a query term has multiple bindings in its from clause and also has its own where clause. In such situations, a closure query is first constructed that includes "everything" that the query term needs (except for the index lookup itself). This closure query is then outer joined with the binary table representing the index.

The final step 303 in the compilation of entity population rules comprises an optimization that is specifically targeted to MapReduce systems such as Hadoop. This optimization makes use of a co-group type of operation that is present in Jaql, and also in PigLatin, and has the ability to group in parallel multiple input sets by the same key. Applying this optimization has a significant impact when an entity needs to aggregate data from many indexes that share the same key. Rather than generating a sequence of binary joins between the parent entity and each of the indexes, a query is generated to fuse all the contributing indexes into a single super-index using the same key. This super-index is then joined, via a single left-outer join operation, in the query for the parent entity.

As an example, assume that in addition to the earlier Employment index, there are several additional indexes that accumulate further information about a person: Board (the board membership history of a person), Holdings (the most current stock holdings for a person), Transactions (the most recent stock transactions by a person). All of these indexes use the same key (the cik of a person) to map to the corresponding entries for a given person. By using the outer join strategy outlined in the previous subsection, the main query for Person needs to include a sequence of (at least four) left outer joins, one for each index that needs to be accessed. Instead, using the co-group strategy, an index fusion operation is performed to merge Employment, Board, Holdings and Transactions into one super-index index (call it FusedIndex). Index fusion is implemented as a single operation of the following form shown at Inset 16. Actual Jaql syntax is slightly different, but the idea is the same.

Inset 16

FusedIndex := cogroup Employment by x = Employment.key,
        Board by x = Board.key,
        Holdings by x = Holdings.key,
        Transactions by x= Transactions.key
    into [ key: x,
        Emp_value: Employment.value,
        Board_value: Board.value,
        Transactions_value: Transactions.value,
        Holdings_value: Holdings.value ];

All the participating indexes are partitioned based on their keys. Then, for each common key value (x), the entries are stitched together from all the participating indexes that actually have something for that key (or put null otherwise). The main entity for Person may then be obtained via a single outer join with FusedIndex that retrieves in one shot the employment, board, holdings and transaction entries for a person. The implementation of the co-group strategy requires three main steps: detection of when multiple indexes can be fused together, generation of the co-group queries that materialize fused indexes, and rewriting of the queries that can benefit from fused indexes.

Index fusion can be very beneficial, especially when the number of indexes that can contribute to an entity becomes large. In particular, this optimization greatly improves the run-time performance of fusion of person entities from social media data sources such as Twitter.

Figure 4:
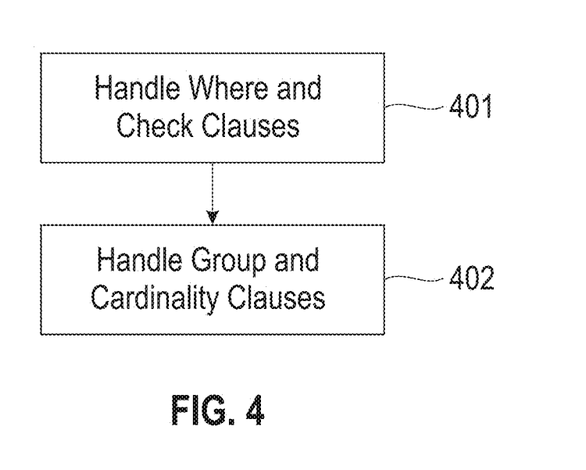
FIG. 4 depicts a method of query generation according to an embodiment of the present invention.

Query generation for entity resolution rules comprises two steps, shown in FIG. 4. The first step 401 handles the where and check clauses. Since the effect of a check clause is local, i.e., it targets individual links, it is safe to apply it in conjunction with the matching predicates of the where clause. The group and cardinality clauses apply to groups of links; thus, all links that belong to a group need to be generated before making a group-based decision on what links to drop. Therefore, these clauses are applied in the second step 402.

In step 401, where and check clauses are handled. While the semantics of an entity resolution rule is based on the cross-product of the inputs specified in the from clause, the compilation algorithm performs two optimizations to produce a more efficient query. First, the matching conditions in the where clause are used to join and select entities from the inputs. Concretely, based on the where clause of er1, the following query is generated for candidate links, corresponding to the union of partial results from each of the matching predicates in er1.

Inset 17 select [p: p, j: j, emp: e, provenance: 'match1']
    from Person p, JobChange j, p.emp e
    where e.company = j.company and compareName(p.name, j.name)
union
select [p: p, j: j, emp: e, provenance: 'match2']
    from Person p, JobChange j, p.emp e
    where normalize(p.name) = normalize(j.name);

Blocking conditions are also pushed, whenever present, as join conditions in the where clauses of the above query terms.

The second optimization incorporates the conditions of the check clauses within each matching condition. A check clause has the form if $p_k$ then $c_k$, which can be re-written as (not $p_k$ or $c_k$). As an example, the check clause of er1 is re-written as null(j.bdate) or null(p.bdate) or j.bdate=p.bdate, and then added as a conjunct in the where clause of both query terms in the above union. While for simplicity the previous query outputs all entities (as well as a provenance attribute), the actual query will project on the attributes mentioned in the select clause of the entity resolution rule, and on any other the attributes used in the group and cardinality clauses. To achieve this, the algorithm performs a look-ahead and marks all attributes that need to be carried over.

At step 402, group and cardinality clauses are handled. Each group and cardinality clause is rewritten as a query. For example, the query for the group clause in rule er1 groups candidate links by the (docID, span) attributes and within each group checks if there are links that satisfy the condition p.name=j.name. Queries for group constraints are executed in the order specified in the entity resolution rule. The queries required for the cardinality constraints are executed last.

Cardinality clauses are more complex. As an example, consider that the cardinality constraint in rule er1 were 1:1 (checking for 1:N is similar but simpler).

---
Inset 18
---
cardinality (docID, span) 1:1 (cik)
---

This clause requires mapping each pair (docID, span) to exactly one cik and vice versa. To enforce this constraint, links are grouped by their (docID, span) attributes and the number of distinct cik values is counted within each group. Each group of links with more than one cik value is rejected as ambiguous. Then, the remaining links are grouped by cik and the number of distinct (docID, span) pairs are counted within each group. Ambiguous groups of links are again rejected. The remaining links comprise the final set of links that is output.

As noted earlier, in some embodiments recursion among entity population rules is prohibited. This avoids generation of recursive queries, which are not supported by some target languages such as Jaql or XQuery. In the absence of recursion, and provided that there are no entity resolution rules, the HIL compilation algorithm constructs a topological sort of all the entities in a HIL program; in this sort, there is a dependency edge from an entity $E_1$ to an entity $E_2$ if there is a rule mapping from $E_1$ to $E_2$. Queries are then generated, in a bottom-up fashion, from the leaves to the roots. The query generation algorithm for each entity E, which was already described, is based on all the rules that have E as target.

However, when entity resolution rules are present, a limited form of recursion may be allowed. Often, in practice, entity resolution needs to use intermediate results in the integration flow, while the results of the entity resolution itself need to be used in the subsequent parts of the flow. For example, the entity resolution 105 performed in flow 100 may make use of the partial Person entities 103 generated after mapping 104. Subsequently, the fusion rules 107 in Step 3 continue to populate into Person 108 (and, in particular, their employment records), based on the result of entity resolution.

To achieve this behavior, the convention is adopted that entity resolution rules induce a staging of the overall program, where the evaluation of all the rules is forced prior to a block of entity resolution rules. Thus, the order of the entity resolution rules in a HIL program becomes important. Concretely, for this example, the entity resolution step 105 requires the evaluation of all the entity population rules in step 104 of flow 100. To this end, all the rules in Step 104 are compiled into a set P1 of queries, using the compilation method for entity population rules. Rule er1 is then compiled using the method described above, into a query P2 that runs on top of the result of P1 (and JobChange 102, which is source data). The PeopleLink table 106 that results after P2 is materialized is used as new source data into the next stage. This stage compiles together the entity population rules in both steps 104 and 107, again using the compilation method for entity population rules. As an example, the query that is generated for Employment incorporates rules from both Step 104 and Step 107. The resulting set P3 of queries will produce the final data.

To achieve the fusion of the data produced by the rules in Step 107 with the data produced by the earlier rules in Step 104, all these entity population rules are recompiled together. In general, after the evaluation of a block of entity resolution rules, all the entity population rules (from the beginning of the HIL program) are compiled and evaluated until the next block of entity resolution rules. Additional optimization is possible, where the materialized results from one stage (e.g., after P1) are reused in the evaluation of the next stages (e.g., in P3).

Figure 5:
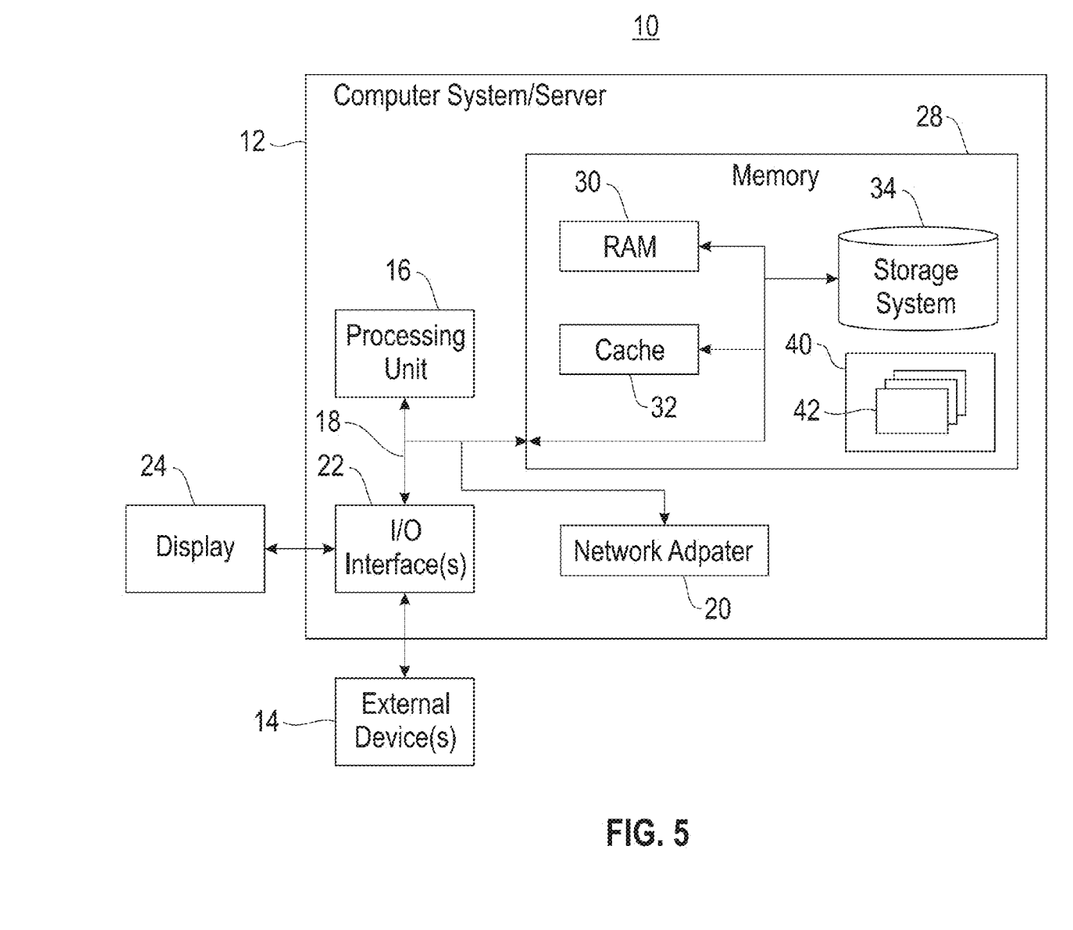
FIG. 5 depicts a computing node according to an embodiment of the present invention.

Referring now to FIG. 5, a schematic of an example of a computing node according to an embodiment of the present invention is provided. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 5, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
reading a plurality of entity population rules, each entity population rule describing a mapping from an input schema to an output schema, the output schema conforming to an entity declaration, the entity declaration describing an entity including at least one nested entity;
compiling the plurality of entity population rules into at least one executable query, wherein
compiling the plurality of entity population rules comprises topologically sorting the entities defined by the plurality of entity population rules based on at least one dependency among the plurality of entity population rules and generating a query by traversing from a leaf to a root of the topologically sorted entities;
reading a plurality of input records from a first data store, the input records conforming to the input schema;
applying a compiled entity resolution rule to the plurality of input records to determine a link between members of the plurality of input records;
applying one of the plurality of entity population rules to the plurality of input records to create a plurality of output records complying with the output schema;
subsequent to applying one of the plurality of entity population rules, recompiling the plurality of entity population rules; and
populating an index of nested entities using the at least one executable query, the index complying with an index declaration, the index declaration describing an index of nested entities, and the index including the link.

2. The method of claim 1, wherein applying the one of the plurality of entity population rules comprises applying a user defined function to the plurality of input records.

3. The method of claim 1, wherein the index of nested entities is shared between the plurality of entity population rules.

4. The method of claim 1, wherein the plurality of entity population rules define an aggregation of the plurality of input records.

5. The method of claim 4, wherein the aggregation is computed by populating an index separate from the entity.

6. The method of claim 1, wherein the at least one nested entity comprises a nested set and the nested entity is populated separately from the entity.

7. The method of claim 1, wherein the plurality of output records comprise a reference to a nested entity by the nested entity referred to by a key to the index.

8. The method of claim 1, further comprising:
reading a second plurality of input records; and
applying another of the plurality of entity population rules to populate the nested entity without modifying the output records.

9. The method of claim 1, wherein compiling the plurality of entity population rules comprises:
implementing the index as a function; and
implementing at least one index lookup as a call to the function.

10. The method of claim 1, wherein compiling the plurality of entity population rules comprises:
implementing the index as a binary table; and
implementing at least one index lookup as a join.

11. The method of claim 1, wherein compiling the plurality of entity population rules comprises:
coalescing the index and an additional index into a super-index.

12. The method of claim 1, wherein determining the link comprises determining a plurality of candidate links and selecting the strongest link from the plurality of candidate links.

13. The method of claim 1, further comprising:
applying another of the plurality of entity population rules to create a second plurality of output records based on the link.

14. The method of claim 1, further comprising compiling an entity resolution rule into the compiled entity resolution rule, compiling the entity resolution rule comprising:
separating where and check clauses of the entity resolution rule from group and cardinality clauses of the entity resolution rule;
using matching conditions of the where clauses to join and select from the output records;
incorporating conditions of the check clauses within each matching condition;
translating the group and cardinality clauses into a constraint query; and
executing the constraint queries.

15. A computer program product for entity population, the computer program product comprising a non-transitory computer readable storage medium having program code embodied therewith, the program code executable by a processor to:
read a plurality of entity population rules, each entity population rule describing a mapping from an input schema to an output schema, the output schema conforming to an entity declaration, the entity declaration describing an entity including at least one nested entity;
compile the plurality of entity population rules into at least one executable query, wherein
compiling the plurality of entity population rules comprises topologically sorting the entities defined by the plurality of entity population rules based on at least one dependency among the plurality of entity population rules and generating a query by traversing from a leaf to a root of the topologically sorted entities;
read a plurality of input records from a first data store, the input records conforming to the input schema;
apply a compiled entity resolution rule to the plurality of input records to determine a link between members of the plurality of input records;
apply one of the plurality of entity population rules to the plurality of input records to create a plurality of output records complying with the output schema;
subsequent to applying one of the plurality of entity population rules, recompile the plurality of entity population rules; and
populate an index of nested entities using the at least one executable query, the index complying with an index declaration, the index declaration describing an index of nested entities, and the index including the link.

16. The computer program product of claim 15, wherein applying the one of the plurality of entity population rules comprises applying a user defined function to the plurality of input records.

17. The computer program product of claim 15, wherein the index of nested entities is shared between the plurality of entity population rules.

18. The computer program product of claim 15, wherein the plurality of entity population rules define an aggregation of the plurality of input records.

19. The computer program product of claim 18, wherein the aggregation is computed by populating an index separate from the entity.

20. The computer program product of claim 15, the program code further executable by a processor to compile an entity resolution rule into the compiled entity resolution rule, wherein compiling the entity resolution rule comprises:
separating where and check clauses of the entity resolution rule from group and cardinality clauses of the entity resolution rule;
using matching conditions of the where clauses to join and select from the output records;
incorporating conditions of the check clauses within each matching condition;
translating the group and cardinality clauses into a constraint query; and
executing the constraint queries.

\* \* \* \* \*